United States Patent

Adkins et al.

[11] Patent Number: 5,826,986
[45] Date of Patent: Oct. 27, 1998

[54] WHEEL BEARING ASSEMBLY

[75] Inventors: David Paul Adkins, Coventry; Mark Stuart Ford, Nuneaton, both of United Kingdom

[73] Assignee: Jaguar Cars, Ltd., Whitley Coventry, England

[21] Appl. No.: 902,990

[22] Filed: Jul. 30, 1997

[30] Foreign Application Priority Data

Aug. 1, 1996 [GB] United Kingdom .................... 9616247
Dec. 12, 1996 [GB] United Kingdom .................... 9625849

[51] Int. Cl.⁶ ...................................................... F16C 17/10
[52] U.S. Cl. ............................................ 384/472; 384/462
[58] Field of Search .................................... 384/472, 462, 384/544, 589, 485

[56] References Cited

U.S. PATENT DOCUMENTS 4,406,333  9/1983  Adams .
4,915,515  4/1990  Rohrer et al. ............................ 384/465
5,494,173  2/1996  Deister et al. ............................ 384/473

FOREIGN PATENT DOCUMENTS 325785   2/1930   United Kingdom .
490995   12/1936  United Kingdom .
1148796  4/1969   United Kingdom .

Primary Examiner—Lenard A. Footland
Attorney, Agent, or Firm—Frank G. McKenzie

[57] ABSTRACT

An improved grease-expelling wheel bearing assembly (1) comprises a grease expelling seal (3), and a grease distributor (5). The grease distributor (5) comprises a collar (7) for mounting about the shaft (9) of a rotor nut (11) and, projecting from the collar (7), at least one grease spreading blade (13) extending radially outwards from the collar towards the assembly housing (15), part (17) of the area between the collar (7) and the housing (15) not being covered by a blade (13), the arrangement being such that rotation of the blade (13) causes grease expelled from the bearing seal (3) to be spread evenly around the circumference of the seal, without preventing its contact with the rotor nut (11).

5 Claims, 2 Drawing Sheets

WHEEL BEARING ASSEMBLY

BACKGROUND OF THE INVENTION

1. Field of the Invention

The present invention relates to an improved wheel bearing assembly in which the wheel bearing seal is grease expelling.

2. Description of the Prior Art

Typically a wheel bearing/rotor nut assembly of a motor vehicle includes a cylindrical housing within which a rotor nut rotates. The rotor nut includes a short shaft extending from its rear face towards the wheel bearing. This serves to space the rear face of the rotor nut from the wheel bearing and its sealing elements. Typically the wheel bearing includes a central rotating member and a circumferential seal which bridges the gap between the rotating and non rotating members of the bearing. This is the main bearing seal, which ensures that dirt and liquid do not enter the moving assembly. A circlip is mounted around the edge of the bearing assembly in a groove within the housing wall. In order to enhance the seal and provide further lubrication in any such assembly, grease or oil needs to be introduced in the annular space defined behind the rear face of the rotor nut.

In an attempt to improve the waterproof seal, wheel bearings are being designed which include bearing seals which expel grease, through at least their outermost seals. The grease is intended to act as a tertiary seal between the rotor nut and the bearing seal. The term 'grease expelling wheel bearing' will be used in the specification to mean any wheel bearing including a bearing seal which is designed to so expel grease. A typical example of such a grease expelling wheel bearing is sold by The Timken Co of 1835, Dueber Avenue SW, P.O. Box 6930, Canton, Ohio 44706/0930, U.S.A.

Although the seal of such a grease expelling wheel bearing assembly is intended to expel grease equally around the edge of the assembly, in practice, the grease expulsion is at times uneven which can lead to a build up of grease that may become packed between the back face of the rotor nut and the bearing seal. Over a period of time this grease becomes contaminated with debris and could then abrade the seal. Such abrasion inevitably leads to wear and degradation of the seal and of the wheel bearing.

If measures are taken to insert a physical barrier such as a shield between the bearing seal and the rotor nut to prevent the grease building up on the rotor nut, this can cause different problems. If the grease expulsion is uneven, there may also be areas where little or no grease is expelled. The presence of a shield can mean that no tertiary seal is formed, and then water can enter the assembly.

SUMMARY OF THE INVENTION

According to the invention, there is provided an improved grease expelling wheel bearing assembly, comprising a grease expelling wheel bearing seal, and a grease distributor, comprising a collar for mounting about the shaft of the rotor nut and projecting from the collar at least one grease spreading blade extending radially outwards from the collar towards to the assembly housing, part of the area between the collar and the housing not being covered by a blade, the arrangement such that the rotation of the collar and blade causes the grease expelled from the bearing seal to be spread evenly around the circumference of the seal, without preventing its contact with the rotor nut.

According to a further aspect of the invention there is provided a grease distributor for a wheel bearing assembly comprising a collar for fitting around the shaft of a rotor nut, and, extending radially outwards of the collar, at least one blade, the dimensions of each blade being such that in use each blade extends to the assembly housing wall, but that part of the area between the shaft and the housing wall is not covered by a blade.

The blade acts to spread grease about the face of the seal but also tends to push the grease onto the cylindrical face of the housing, which is the most efficient position for the tertiary sealing action of the seal.

Preferably the collar is cylindrical with a diameter slightly greater than the diameter of the shaft of the rotor nut so that the collar rotates with the rotor nut.

However in order to ensure that the collar does not crack due to expansion of the shaft, it is preferred that the diameter of the collar is greater than the greatest possible diameter of the shaft and the collar includes resilient means to grip the shaft to ensure that it rotates with the rotor nut.

Preferably the resilient means includes at least one resilient finger urged towards the shaft. Preferably the collar includes three resilient fingers.

Preferably the resilient fingers are integral with the collar forming projections which bend inwards towards the shaft.

The grease distributor may include a plurality of blades, the maximum number being decided by the area covered by the blades. It is preferred that less than half of the area of the annulus between the collar and the edge of the housing does not have a blade covering it. This means that there is sufficient space for the grease to pass to the edge of the rear face of the rotor nut.

It is preferred that the grease distributor includes an even number of blades, comprising one or more diametrically opposed pairs. This provides a balanced arrangement. Preferably the grease distributor includes two or four blades, most preferably it includes two blades.

The grease distributor can be of a number of materials such as metal, rubber or nylon. Since it should be lightweight, cheap and hardwearing, preferably it is of nylon.

Each blade should extend to as close to the housing wall as possible without interfering with the rotation of the rotor nut within the housing. Typically the edge of the blade extends to within 1 mm of the housing wall.

Since one area where grease often is expelled and can accumulate is in the region of the holes of the circlip, preferably the blade extends to the holes of the circlip so that any grease accumulating in this area is contacted by the blade and distributed around the housing wall. The grease distributor is preferably arranged such that the edge of the blade lies at a distance of between 0.5 mm and 1.0 mm from the plane of the circlip.

Although the blade may be planar lying in a plane substantially parallel to the plane of the circlip, preferably the leading face of the blade (in the direction of rotation) is tilted to the plane of the circlip so that the leading edge is tilted towards the face of the wheel bearing.

Preferably the leading face of the blade lies at an angle of substantially 30° to the plane of the circlip.

Although the blade may be of constant cross section, it is preferred that the blade tapers so that its leading edge (in the direction of rotation) forms a sharp edge of small cross section to aid in 'scooping up' the grease, especially from the region of the circlip holes.

For ease of manufacture it is preferred that the grease distributor is not left or right handed so that the same design may be used on all wheels of the car. It is therefore preferred that each blade is symmetrical about a plane parallel to a diametral plane of the shaft with the blade tapering in two directions from the plane towards each edge.

BRIEF DESCRIPTION OF THE DRAWINGS

Three grease distributors and wheel bearing assemblies in accordance with the invention will now be described, by way of example only, with reference to the accompanying drawings, in which.

DESCRIPTION OF THE PREFERRED EMBODIMENT

Figure 1:
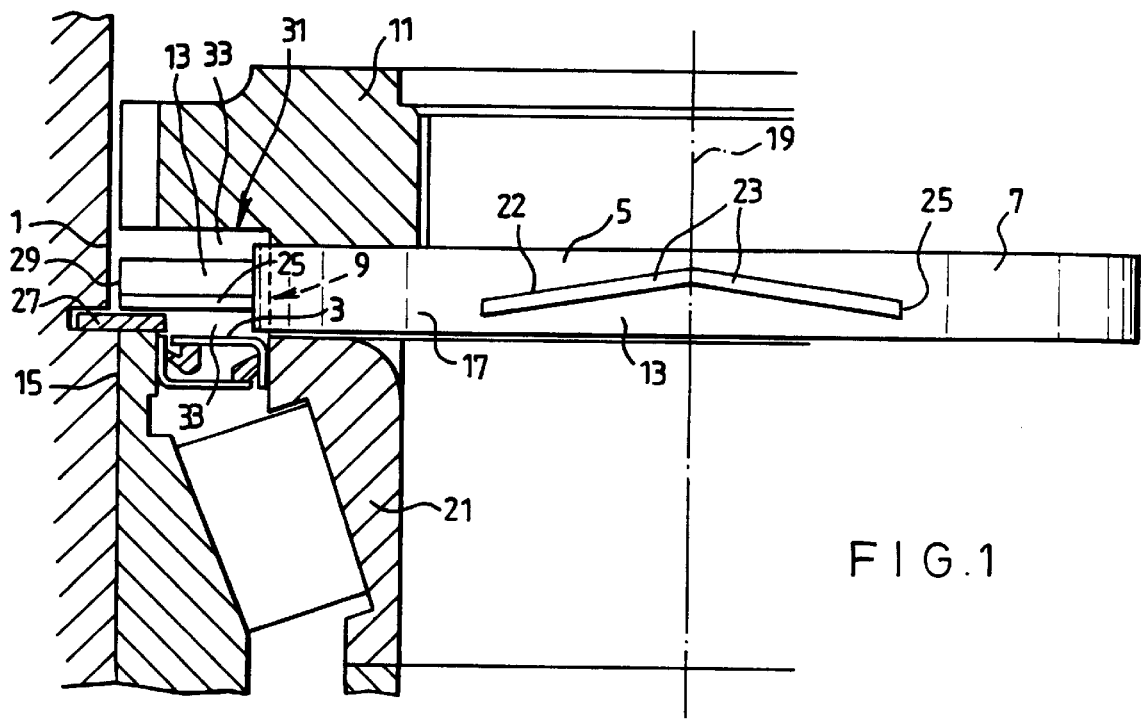
FIG. 1 is a cross section through a first wheel bearing assembly.

An improved grease expelling wheel bearing assembly 1 comprises a grease expelling seal 3, and a grease distributor 5. The grease distributor 5 comprises a collar 7 for mounting about the shaft 9 of the rotor nut 11 and, projecting from the collar 7, at least one grease spreading blade 13 extending radially outwards from the collar towards the assembly housing 15, part 17 of the area between the collar 7 and the housing 15 not being covered by a blade 13, the arrangement being such that rotation of the blade 13 causes the grease expelled from the bearing seal 3 to be spread evenly around the circumference of the seal, but not to prevent the grease from contacting the rotor nut 11.

In the assembly illustrated in FIG. 1, the grease distributor 5 includes four blades 13. Only two of the blades can be seen in the drawing—each of the blades illustrated has a diametrically opposed blade which is not illustrated. The shape of the blades are all the same and can be clearly seen.

Each blade 13 is of constant cross section and symmetrical about a diametral plane 19 of the shaft. The blade is in the form of a shallow inverted V-shape so that its leading face 22 lies at an angle to the plane of the circlip 27. The leading edge thus is tilted towards the bearing 21. Thus the blade operates effectively irrespective of the direction of rotation of the collar. The blade can be regarded as two halves 23, only one of which operates at once.

The edge of the blade is close to the surface of the circlip 27. The distance is between 0.5 mm and 1 mm. The radial edge 29 of the blade is spaced at 1 mm from the housing wall so that the blade overlaps the circlip but allows sufficient clearance between the rotating members and the housing.

In operation the bearing seal 3 between the parts of the bearing 21 expels grease, and this expulsion may be uneven especially in the region of the holes of the circlip 27. In order to prevent build up of grease behind the rear face 31 of the rotor nut in space 33, the blades 13 of the grease distributor 5 scoop up the grease from the region of the circlip holes and distribute the grease around the walls of the housing 15. This grease will extend to the edge of the rotor nut 11.

Thus there will be grease in the region of the peripheral edge of the rotor nut so preventing the ingress of water or debris by this route, but without a build up of grease in the space 33. This extends the life of seal 3.

Figure 2:
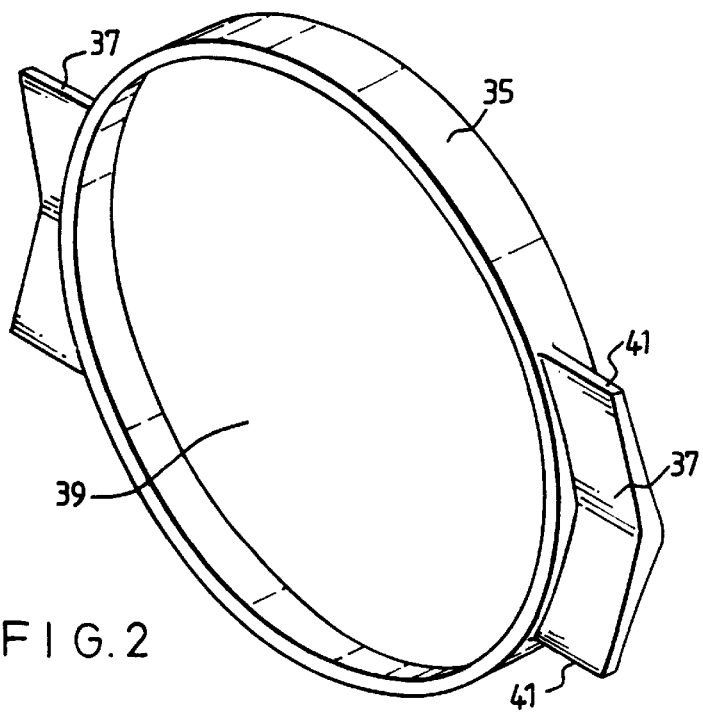
FIG. 2 is a perspective view of a second grease distributor.
Figure 3:
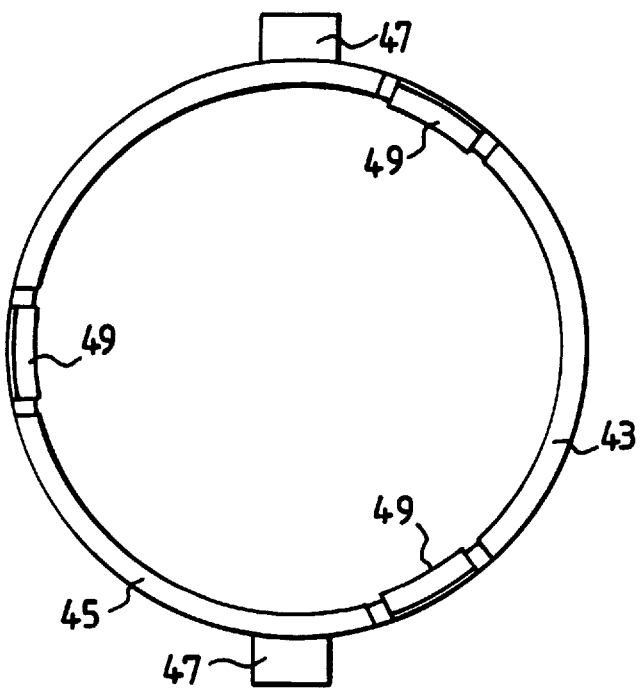
FIG. 3 is a plan view of a third grease distributor.
Figure 4:
FIG. 4 is a partial section of the grease distributor of FIG. 3.

FIG. 2 illustrates a second example of a grease distributor 35 which includes two blades 37. Each blade is not of constant cross section with the blade tapering from a central diametral plane 39 to each edge 41.

FIGS. 3 to 6 illustrate a third example of a grease distributor 43, which comprises an essentially annular collar 45 having two diametrically opposed grease spreading blades 47 which project radially outwards from the collar 45.

Figure 5:
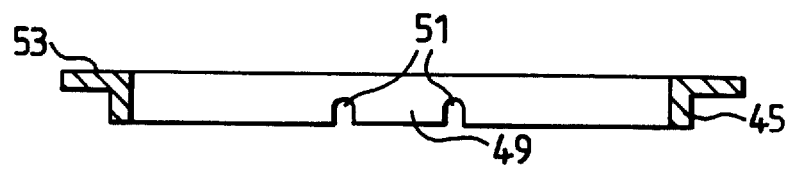
FIG. 5 is a sectional elevation taken along line I—I of FIG. 3.
Figure 6:
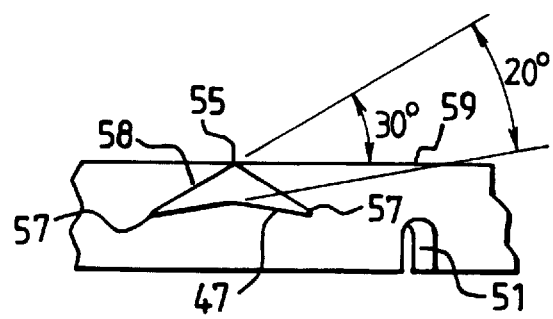
FIG. 6 is a part side elevation of the grease distributor of FIG. 3.

Although the collar 45 is essentially annular, it includes three equally spaced cut out projections 49 which form resilient fingers. The collar 45 includes three sets of parallel slots 51 as illustrated in FIG. 5 which define between them an projection 49, which is bent towards the inside of the annulus, i.e. towards the shaft onto which the collar is to be mounted.

The collar is made of glass nylon which would crack if the collar were too tightly fitted on a shaft that subsequently expanded. By mounting the collar so that there is some clearance between the inner annular surface 53 and the surface of a shaft onto which it is to be mounted, the collar will not crack. The resilient fingers bear on the shaft to hold the collar firmly in position on the shaft so that it rotates with the collar.

The blade 47 is symmetrical about diametral plane 55 and tapers from its centre to its two outer edges 57. The leading face 58 of the blade lies at an angle of 30° to the plane 59 forming the upper rim of the collar, which is parallel to the surface of the circlip (not shown) over which the blade will pass. The inner face 61 of the blade lies at 20° to the leading face 58. This shape of blade provides an optimum spreading surface for the distributor.

We claim:

1. An improved grease-expelling wheel bearing assembly, comprising:

the assembly housing;

a rotor nut having a mounting shaft portion;

a grease-expelling wheel bearing seal having an outwardly directed surface;

a grease distributor having a collar for mounting about the shaft of the rotor nut, at least one grease spreading blade extending radially outward from the collar towards the assembly housing, rotation of the collar and blade causing grease expelled from the bearing seal to be spread on said surface of the seal and allowing grease to contact the rotor nut.

2. A wheel bearing assembly according to claim 1, further comprising a planar circlip having a central opening, and wherein each blade extends radially to a position overlying the central opening of the circlip.

3. A wheel bearing assembly according to claim 2, in which a leading face of the blade is tilted with respect to the plane of the circlip, such that the leading edge of the blade tilts towards the wheel bearing.

4. A wheel bearing assembly according to claim 3, in which the leading face of the blade lies at an angle of substantially 30° to the plane of the circlip.

5. A wheel bearing assembly according to claim 1, in which the blade is symmetrical about a plane parallel to a diametrical plane of the shaft.

* * * * *